(12) United States Patent
Nagao et al.

(10) Patent No.: US 10,570,927 B2
(45) Date of Patent: Feb. 25, 2020

(54) BOOSTING SYSTEM, AND BOOSTING METHOD OF GAS

(71) Applicant: MITSUBISHI HEAVY INDUSTRIES COMPRESSOR CORPORATION, Tokyo (JP)

(72) Inventors: Hideki Nagao, Hiroshima (JP); Natao Yonemura, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 620 days.

(21) Appl. No.: 14/897,273

(22) PCT Filed: Jan. 14, 2014

(86) PCT No.: PCT/JP2014/050420
§ 371 (c)(1),
(2) Date: Dec. 10, 2015

(87) PCT Pub. No.: WO2015/107615
PCT Pub. Date: Jul. 23, 2015

(65) Prior Publication Data
US 2016/0123351 A1 May 5, 2016

(51) Int. Cl.
*F04D 29/58* (2006.01)
*F04D 29/32* (2006.01)
(Continued)

(52) U.S. Cl.
CPC .......... *F04D 29/5826* (2013.01); *F04B 23/04* (2013.01); *F04B 41/06* (2013.01);
(Continued)

(58) Field of Classification Search
CPC ......... F25J 2230/80; F25J 1/0042–0045; F25J 1/0201–0202; F25J 1/0221; F25J 1/0224; F25J 2270/02
See application file for complete search history.

(56) References Cited

U.S. PATENT DOCUMENTS

2008/0156035 A1 7/2008 Aspelund et al.
2013/0156543 A1 6/2013 Sassanelli et al.
(Continued)

FOREIGN PATENT DOCUMENTS

CN 101052852 A 10/2007
CN 102834619 A 12/2012
(Continued)

OTHER PUBLICATIONS

English translation of JP 2010266154 A, provided by Espacenet. May 2018.*
(Continued)

*Primary Examiner* — Tareq Alosh
(74) *Attorney, Agent, or Firm* — Birch, Stewart, Kolasch & Birch, LLP (57) ABSTRACT

A boosting system which boosts a target gas to a pressure which is equal to or greater than a target pressure higher than a critical pressure includes a compression portion which compresses the target gas to an intermediate pressure which is equal to or greater than the critical pressure and is less than the target pressure to generate an intermediate supercritical fluid, a cooling portion which cools the intermediate supercritical fluid generated by the compression portion to a temperature near to a critical temperature to generate an intermediate supercritical pressure liquid, a pump portion which boosts the intermediate supercritical pressure liquid generated by the cooling portion to a pressure which is equal to or greater than the target pressure, and a cooling temperature adjusting portion which adjusts a temperature of the intermediate supercritical pressure liquid generated by the cooling portion in an upstream side of a pump.

5 Claims, 4 Drawing Sheets

(51) Int. Cl.
| | |
|---|---|
| *F04D 15/00* | (2006.01) |
| *F04D 29/18* | (2006.01) |
| *F04D 27/00* | (2006.01) |
| *F04D 29/28* | (2006.01) |
| *F04D 29/22* | (2006.01) |
| *F04B 41/06* | (2006.01) |
| *F04D 13/12* | (2006.01) |
| *F25J 3/02* | (2006.01) |
| *F04B 23/04* | (2006.01) |
| *F25J 3/06* | (2006.01) |
| *F04D 25/16* | (2006.01) |

(52) U.S. Cl.
CPC ......... *F04D 13/12* (2013.01); *F04D 15/0005* (2013.01); *F04D 15/0022* (2013.01); *F04D 25/16* (2013.01); *F04D 27/002* (2013.01); *F04D 29/181* (2013.01); *F04D 29/22* (2013.01); *F04D 29/286* (2013.01); *F04D 29/321* (2013.01); *F04D 29/5833* (2013.01); *F04D 29/5866* (2013.01); *F25J 3/0266* (2013.01); *F25J 3/067* (2013.01); *F25J 2230/32* (2013.01); *F25J 2230/80* (2013.01); *F25J 2235/80* (2013.01); *F25J 2270/02* (2013.01); *F25J 2270/80* (2013.01); *Y02C 10/12* (2013.01)

(56) References Cited

U.S. PATENT DOCUMENTS

2013/0291719 A1   11/2013   Stallmann
2013/0340472 A1   12/2013   De Cayeux et al.

FOREIGN PATENT DOCUMENTS

| CN | 103391802 A | 11/2013 |
| EP | 2 476 476 A1 | 7/2012 |
| EP | 2 896 453 A | 7/2015 |
| JP | 61-224014 A | 10/1986 |
| JP | 1-222194 A | 9/1989 |
| JP | 5-280860 A | 10/1993 |
| JP | 2008-506620 A | 3/2008 |
| JP | 2010-266154 A | 11/2010 |
| JP | 2011-75205 A | 4/2011 |
| JP | 2013-519864 A | 5/2013 |
| WO | WO 2011/101296 A1 | 8/2011 |

OTHER PUBLICATIONS

Chinese Office Action and Chinese Search Report, dated Aug. 11, 2016, for Chinese Application No. 201480029920.4, along with English translations.

Extended European Search Report, dated Aug. 1, 2016, for European Application No. 14878877.1.

Office Action dated Oct. 4, 2016 in Counterpart JP Application No. 2015-557604 with an English Translation.

Hiroshi Funakoshi, Industrial Machinery, Aug. 20, 2013, No. 755, pp. 21 to 22.

International Search Report dated Apr. 15, 2014 in Application No. PCT/JP2014/050420 with English Translation.

Written Opinion dated Apr. 15, 2014 in Application No. PCT/JP2014/050420 with English Translation.

* cited by examiner

BOOSTING SYSTEM, AND BOOSTING METHOD OF GAS

TECHNICAL FIELD

The present invention relates to a boosting system and a boosting method for boosting gas.

BACKGROUND ART

A boosting system is a device which boosts a target gas to a target pressure.

Here, in recent years, a problem such as global warming due to an increase of emission of carbon dioxide which is known as a greenhouse gas has been evident. Particularly, a large amount of carbon dioxide is included in exhaust gas of a thermal power station, and a technology is known, which boosts gas using a boosting system after the carbon dioxide is separated and recovered, stores the carbon dioxide under the ground on land or under the ground of a sea bottom, and decreases carbon dioxide in the atmosphere.

In this boosting system, carbon dioxide is sequentially compressed by a compressor having multiple stages, the carbon dioxide in which the pressure and the temperature of the carbon dioxide are equal to or greater than a supercritical pressure and a supercritical temperature is cooled by an after-cooler, and the carbon dioxide having a target temperature and pressure suitable for transport and storage can be obtained.

However, in order to obtain the carbon dioxide having the target temperature and pressure in the system including only the compressor which boosts the carbon dioxide to the above-described gas state, an after-cooler having super-high pressure and a large capacity is required, a super-high pressure compression region is generated. Accordingly, operation efficiency or reliability of the entire boosting system decreases.

Here, for example, PTL 1 discloses a boosting system (carbon dioxide liquefied device) in which the above-described after-cooler is not used. In this boosting system, a compressor is provided on a front stage side of the system, a pump is provided on a rear stage side of the system, and compression of carbon dioxide is sequentially performed. In addition, when carbon dioxide is introduced from the compressor into the pump, the carbon dioxide is efficiently liquefied using cold energy of the carbon dioxide which is boosted by the pump and brought into a liquid state of a supercritical pressure.

CITATION LIST

Patent Literature

[PTL 1] Japanese Unexamined Patent Application Publication No. 2010-266154

SUMMARY OF INVENTION

Technical Problem

In the boosting system of PTL 1, an after-cooler is not required by combining the compressor and the pump and it is possible to achieve a reduction in power consumption. However, in a state where gas (carbon dioxide) is not boosted to only a pressure less than a critical pressure by the compressor, the gas is cooled and liquefied, and is introduced into the pump. Accordingly, an amount of cold energy required for liquefaction significantly increases, a lower temperature is required for liquefaction, and a great amount of power is required in an external refrigeration cycle. Accordingly, there is room for improvement in the entire operation efficiency.

In addition, in the boosting system of PTL 1, in order to adjust a target temperature and a target pressure, it is necessary to use a compressor having a driving portion which uses an expensive variable speed motor capable of changing output or to provide a pressure adjustment valve having high-pressure resistance specifications on an outlet of a compressor.

The present invention is to provide a boosting system and a boosting method of gas capable of improving operation efficiency and adjusting a target temperature and a target pressure.

Solution to Problem

According to an aspect of the present invention, there is provided a boosting system which boosts a target gas to a pressure which is equal to or greater than a target pressure higher than a critical pressure, including: a compression portion which compresses the target gas to an intermediate pressure which is equal to or greater than the critical pressure and is less than the target pressure to generate an intermediate supercritical fluid; a cooling portion which cools the intermediate supercritical fluid generated by the compression portion to a temperature near to a critical temperature to generate an intermediate supercritical pressure liquid; a pump portion which boosts the intermediate supercritical pressure liquid generated by the cooling portion to a pressure which is equal to or greater than the target pressure; and a cooling temperature adjusting portion which adjusts a temperature of the intermediate supercritical pressure liquid generated by the cooling portion using a cooling medium in an upstream side of the pump portion.

According to this boosting system, compression in a front stage side is performed by the compression portion, boosting with respect to the intermediate supercritical fluid using force-feeding of the intermediate supercritical fluid in a rear stage side having a higher pressure is performed by the pump portion, and a fluid having a pressure equal to or greater than a target pressure can be obtained. That is, when the compressor is applied to perform compression with respect to a high-pressure portion of the rear stage side, multiple high-pressure seals or multiple compressor casings corresponding to a high pressure are required. However, since the correspondence to a high pressure is not required by adopting the pump portion in the rear stage side, it is possible to reduce costs or improve reliability, and since an after-cooler which cools a supercritical fluid after compression is performed is not required, it is possible to reduce power consumption.

Here, compared to a case where cooling is performed in a state where a pressure is less than the critical pressure, since the intermediate supercritical fluid which has been compressed so as to be equal to or greater than the critical pressure by the compression portion is cooled so as to be the intermediate supercritical pressure liquid in the cooling portion, it is possible to perform liquefaction while significantly decreasing the quantity of heat required for cooling.

In addition, it is possible to adjust the temperature of the intermediate supercritical pressure liquid which is generated by the cooling portion using the cooling temperature adjusting portion which is provided in the upstream side of the pump portion. Accordingly, even when a rotation speed of a pump in the pump portion is constant, it is possible to adjust a pressure of a target supercritical fluid which is generated finally by adjusting a temperature of the intermediate supercritical pressure liquid generated by the cooling portion.

In the boosting system according to the aspect of the present invention, the boosting system may further include a heating portion which heats the intermediate supercritical pressure liquid boosted by the pump portion to a temperature near to the critical temperature and generates a target supercritical fluid, and the cooling portion may include a main cooling portion which performs heat exchange between the heating portion and the main cooling portion to cool the intermediate supercritical fluid.

According to this boosting system, compression in the front stage side is performed by the compression portion, boosting with respect to the intermediate supercritical fluid using force-feeding of the intermediate supercritical fluid in the rear stage side having a higher pressure is performed by the pump portion, and a fluid having a pressure equal to or greater than a target pressure can be obtained. Thereafter, the fluid is heated so as to be equal to or greater than the critical temperature finally obtained by the heating portion, and it is possible to obtain a supercritical fluid having a target pressure and a target temperature.

In addition, the intermediate supercritical fluid which has been compressed by the compression portion is cooled by the main cooling portion in the cooling portion, the intermediate supercritical pressure liquid is generated, the intermediate supercritical pressure liquid can be introduced into the pump portion, and heat exchange between the main cooling portion and the heating portion is performed using heat which is recovered when the intermediate supercritical fluid is cooled. Accordingly, the intermediate supercritical pressure liquid is effectively heated so as to be equal to or greater than the critical temperature, and it is possible to obtain the supercritical fluid having a target pressure and a target temperature (target supercritical fluid).

In addition, in the boosting system according to the aspect of the present invention, the cooling temperature adjusting portion of the above-described aspect may extract a portion of the intermediate supercritical fluid generated by the compression portion and use the extracted fluid as the cooling medium.

According to this configuration, since cold energy of the intermediate supercritical pressure liquid itself which is introduced into the pump portion can be effectively used, it is possible to securely generate the intermediate supercritical pressure liquid introduced into the pump portion without separately installing a condenser required for generating the intermediate supercritical pressure liquid from the intermediate supercritical fluid.

Moreover, in the boosting system according to the aspect of the present invention, the cooling temperature adjusting portion of the above-described aspect may adjust a flow rate of the cooling medium which is supplied to the cooling portion.

According to this boosting system, it is possible to adjust the temperature and the pressure of the intermediate supercritical fluid generated by the cooling portion so as to be desired values by adjusting the flow rate of the cooling medium.

In addition, in the boosting system according to the aspect of the present invention, the boosting system of the above-described aspect may include a pressure detection portion which detects a pressure of the target supercritical fluid, a flow rate adjusting portion which adjusts a flow rate of the cooling medium, a control portion which adjusts the flow rate of the cooling medium based on a detection value detected by the pressure detection portion, and the control portion may include a determination portion which determines whether or not the detection value belongs to a predetermined pressure range, and a flow rate determination portion which determines a flow rate adjusted by the flow rate adjusting portion, based on a determination result of the determination portion.

According to this configuration, whether or not the target pressure of the supercritical pressure fluid which is detected by the pressure detection portion belongs to a predetermined pressure range is determined by the determination portion, and based on this determination, the flow rate determination portion can determine the flow rate of the cooling medium supplied to the main cooling portion.

In other words, when the target pressure of the supercritical pressure fluid is deviated from the predetermined and desired pressure, the flow rate determination portion adjusts the flow rate of the cooling medium based on the determination result of the determination portion. Accordingly, it is possible to more stably maintain the pressure of the target supercritical pressure fluid.

According to another aspect of the present invention, there is provided a boosting method of gas which boosts a target gas to a pressure which is equal to or greater than a target pressure higher than a critical pressure, including: a compression step of compressing the target gas to an intermediate pressure which is equal to or greater than the critical pressure and is less than the target pressure to generate an intermediate supercritical fluid; a cooling step of cooling the intermediate supercritical fluid generated in the compression step to a temperature near to a critical temperature to generate an intermediate supercritical pressure liquid; a cooling temperature adjusting step of adjusting a temperature of the intermediate supercritical pressure liquid generated in the cooling step; and a pumping step of boosting the intermediate supercritical pressure liquid generated in the cooling step to a pressure which is equal to or greater than the target pressure, in which in the cooling step, the intermediate supercritical fluid is cooled using at least one of the intermediate supercritical pressure liquid boosted in the pumping step, a low-temperature liquid which is generated by extracting the intermediate supercritical pressure liquid before the pumping step starts and decompressing the extracted liquid to a pressure near to the critical pressure, and an external cooling medium, as a cooling medium.

According to the boosting method of gas, the pumping step is provided after the compression step. Accordingly, compared to a case where the gas is boosted to a pressure equal to or greater than the target pressure by only the compression step, costs can be reduced since correspondence to a high pressure is not required, and it is possible to reduce power consumption since the after-cooler which cools the supercritical fluid after boosting is performed is not required.

In addition, compared to a case where cooling is performed in a state where a pressure is less than the critical pressure, since the intermediate supercritical fluid which has been compressed so as to be equal or greater than the critical pressure by the compression portion is cooled so as to be the intermediate supercritical pressure liquid in the cooling step, it is possible to perform liquefaction while significantly decreasing the quantity of heat required for cooling. In addition, in the cooling step, it is possible to effectively cool the intermediate supercritical fluid using the intermediate supercritical pressure liquid, the low-temperature liquid, the external cooling medium, or the like. Moreover, in the cooling temperature adjusting step, by adjusting the temperature of the intermediate supercritical pressure liquid generated in the cooling step, it is possible to adjust the pressure of the target supercritical pressure fluid in a state where a rotation speed of a pump in the pump portion is constantly maintained.

Advantageous Effects of Invention

According to a boosting system and a boosting method of gas of the present invention, a compression portion and a pump portion are combined and an intermediate supercritical fluid is cooled at a pressure equal to or greater than the critical pressure in the cooling portion, and it is possible to further reduce power consumption and improve operation efficiency.

In addition, since a cooling temperature adjusting portion adjusts a temperature of the intermediate supercritical fluid generated by the cooling portion, it is possible to adjust the pressure of the target supercritical fluid.

DESCRIPTION OF EMBODIMENTS

Hereinafter, a boosting system 1 according to an embodiment of the present invention will be described. In the present embodiment, the boosting system 1 is a geared compressor, in which a pump for boosting gas of carbon dioxide F which is a target gas to a predetermined pressure and temperature is incorporated, so as to store the gas under the ground on land or under the ground of a sea bottom.

In addition, the geared compressor is a multiaxial and multistage type compressor in which multiple impellers are interlocked via gears.

Figure 1:
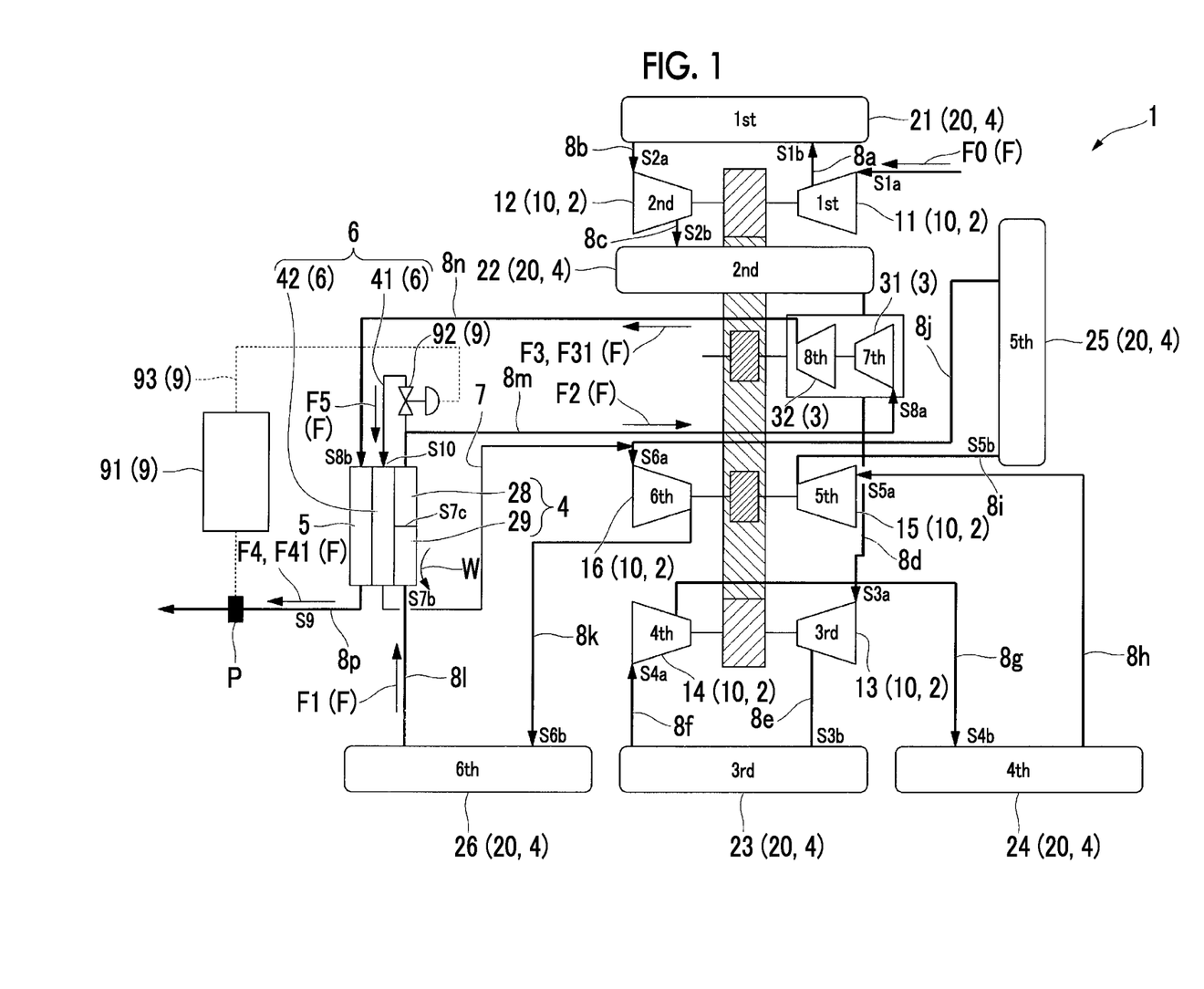
FIG. 1 is a schematic diagram showing an outline of a boosting system according to an embodiment of the present invention.

As shown in FIG. 1, the boosting system 1 includes a compression portion 2 which suctions and compresses the carbon dioxide F which is a target gas, a pump portion 3 which is provided on a rear stage side of the compression portion 2 and boosts the carbon dioxide F, and a cooling portion 4 which is provided between the compression portion 2 and the pump portion 3.

In addition, the boosting system 1 includes a heating portion 5 which heats the carbon dioxide F boosted by the pump portion 3, a liquid extraction and decompression portion 6 which is provided between the cooling portion 4 and the pump portion 3 and extracts the carbon dioxide F, and a bypass flow path 7 which returns the carbon dioxide F from the liquid extraction and decompression portion 6 to compression portion 2.

Moreover, the boosting system 1 includes a pressure detection portion P which detects a pressure of the carbon dioxide F heated by the heating portion 5, and a cooling temperature adjusting portion 9 which adjusts a flow rate of the carbon dioxide F extracted by the liquid extraction and decompression portion 6 according to a pressure value of the carbon dioxide F detected by the pressure detection portion P.

The compression portion 2 includes multiple impellers 10 which are provided in multiple stages (six stages in the present embodiment), and multiple intermediate coolers 20, each of which is provided between the impellers 10 and between the compression portion 2 and the cooling portion 4. In addition, the compression portion 2 compresses the suction carbon dioxide F so as to be a pressure which is an intermediate pressure equal to or greater than a critical pressure and less than a target pressure while repeatedly compressing and cooling the suctioned carbon dioxide F as an introduction gas F0, and an intermediate supercritical fluid F1 is generated.

The critical pressure of the carbon dioxide F is 7.4 [MPa]. As the target pressure, a higher value than the critical pressure, for example, 15 [MPa] is set. Moreover, as the intermediate pressure of the intermediate supercritical fluid F1 generated by the compression portion 2, for example, 10 [MPa] is set. However, the pressure values are appropriately determined according to a critical pressure of a target gas, and are not uniquely limited by the present embodiment.

Here, the compression portion 2 includes a first stage compression impeller 11, a first intermediate cooler 21, a second stage compression impeller 12, a second intermediate cooler 22, a third stage compression impeller 13, a third intermediate cooler 23, a fourth stage compression impeller 14, a fourth intermediate cooler 24, a fifth stage compression impeller 15, a fifth intermediate cooler 25, a sixth stage compression impeller 16, and a sixth intermediate cooler 26, through which the suctioned carbon dioxide F circulates, and which are provided in this order from an upstream side toward a downstream side and are connected to one another by pipe lines 8a, 8b, 8c, 8d, 8e, 8f, 8g, 8h, 8i, 8j, 8k, 8l, 8m, and 8n.

The cooling portion 4 is connected to the downstream side of the sixth intermediate cooler 26 via the pipe line 8l, cools and liquefies the intermediate supercritical fluid F1 generated by the sixth stage compression impeller 16 which is the final stage of the compression portion 2 to a temperature near to the critical temperature, and generates an intermediate supercritical pressure liquid F2.

The cooling portion 4 includes a pre-cooling portion 29 which pre-cools the intermediate supercritical fluid F1 generated by the compression portion 2, and a main cooling portion 28 which further cools the intermediate supercritical fluid F1 which has been cooled by the pre-cooling portion 29 and generates an intermediate supercritical pressure liquid F2.

The pre-cooling portion 29 is a heat exchanger which pre-cools the intermediate supercritical fluid F1 by an external cooling medium W.

A low-temperature liquid F5 from the liquid extraction and decompression portion 6 described below is introduced into the main cooling portion 28, and the main cooling portion 28 cools the intermediate supercritical fluid F1 with the low-temperature liquid F5 as a cooling medium. In addition, in the present embodiment, in a portion between the main cooling portion 28 and the heating portion 5, a heating function of the heating portion 5 is performed by heat obtained by cooling the intermediate supercritical fluid F1 using the main cooling portion 28, and accordingly, the portion configures one heat exchanger.

A cooling medium of the main cooling portion 28 is the low-temperature liquid F5 from the liquid extraction and decompression portion 6. However, when an appropriate cooling medium W is obtained from the outside, since the pre-cooling is performed by the pre-cooling portion 29, it is possible to decrease an amount of cold energy needed in the main cooling portion 28. Cooling capacity of the pre-cooling portion 29 becomes different according to a temperature, a flow rate, or the like of the external cooling medium W suctioned from the outside by the pre-cooling portion 29. In the present embodiment, the intermediate supercritical fluid F1 generated by the compression portion 2 is cooled to a transition region to a fluid using only the sixth intermediate cooler 26 without using the pre-cooling portion 29, and thereafter, the intermediate supercritical fluid F1 is liquefied by the main cooling portion 28, and the intermediate supercritical pressure fluid F2 is generated.

In addition, when the intermediate supercritical fluid F1 is cooled to a temperature near to the critical temperature by the cooling portion 4, preferably, the intermediate supercritical fluid F1 is cooled to a temperature of the critical temperature ±20[° C.], more preferably, is cooled to a temperature of the critical temperature ±15[° C.], and most preferably, is cooled to a temperature of the critical temperature ±10[° C.].

The pump portion 3 is connected to the downstream side of the cooling portion 4 via the pipe line 8$m$, the intermediate supercritical pressure liquid F2 which passes through the cooling portion 4 and is generated is introduced into the pump portion 3, and the pump portion 3 boosts intermediate supercritical pressure liquid F2 to a target pressure and generates a target pressure liquid F3. In the present embodiment, the pump portion 3 has a two-stage configuration configured of a first stage pump impeller 31 and a second stage pump impeller 32.

The heating portion 5 is provided so as to be connected to the downstream side of the pump portion 3 via the pipe line 8$n$, the target pressure liquid F3 from the pump portion 3 is introduced into the heating portion 5, and a target supercritical fluid F4 having a temperature equal to or higher than the critical temperature (31.1[° C.]) is generated. As described above, the heating portion 5 configures a heat exchanger along with the main cooling portion 28 of the cooling portion 4.

That is, in the heating portion 5, heat exchange between the heating portion 5 and the main cooling portion 28 is performed, and the target pressure liquid F3 is heated by condensation heat which is obtained by cooling the intermediate supercritical fluid F1 using the main cooling portion 28.

In addition, the pipe line 8$p$ is provided on the downstream side of the heating portion 5. The target supercritical fluid F4 generated by the heating portion 5 circulates through the pipe line 8. An external apparatus (not shown) is connected to the downstream side of the pipe line 8$p$, and the target supercritical fluid F4 is extracted to the external apparatus.

A pressure detection portion P is provided in an intermediate position of the pipe line 8$p$. The pressure detection portion P includes pressure measurement means for measuring a pressure value of the target supercritical fluid F4 circulating through the pipe line 8$p$, and means for transmitting the pressure value to the outside as electric signals. For example, as the pressure detection portion P, a well-known pressure sensor module or the like may be adopted.

The liquid extraction and decompression portion 6 is provided between the main cooling portion 28 and the pump portion 3, cools the intermediate supercritical fluid F1 by the main cooling portion 28 using the low-temperature liquid F5 obtained by extracting a portion of the intermediate supercritical pressure liquid F2 from the main cooling portion 28, and the low-temperature liquid F5 itself is heated.

Specifically, the liquid extraction and decompression portion 6 includes a branched pipe line 41 in which one end is connected to the pipe line 8$m$ so as to be branched from the pipe line 8$m$ between the main cooling portion 28 and the pump portion 3, and a heat exchange portion 42 which is connected to the other end of the branched pipe line 41 and performs heat exchange between the main cooling portion 28 and the liquid extraction and decompression portion 6. In addition, a flow rate adjusting portion 92 described below is provided in an intermediate position of the branched pipe line 41. The flow rate adjusting portion 92 is a valve portion capable of adjusting an opening degree of the flow rate adjusting portion 92. In the present embodiment, for example, as the valve portion, a flow rate adjustment valve is adopted.

The cooling temperature adjusting portion 9 includes a control portion 91 which is electrically connected to the pressure detection portion P and a flow rate adjusting portion 92 which is electrically connected to the control portion 91 via a control signal line 93.

The flow rate adjusting portion 92 performs decompression by the Joule-Thompson effect with respect to the intermediate supercritical pressure liquid F2 which is extracted by adjusting an opening degree of the flow rate adjusting portion 92, and generates the low-temperature liquid F5. Here, the opening degree of the above-described flow rate adjusting portion 92 is controlled by the control portion 91.

Figure 3:
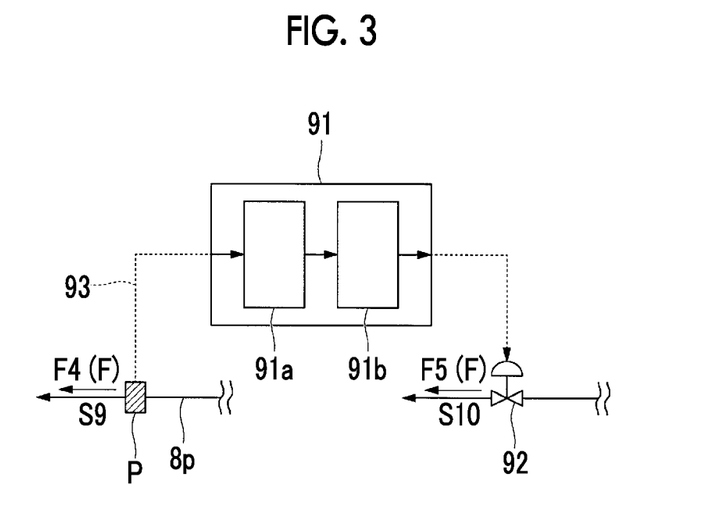
FIG. 3 is an enlarged diagram of a main portion showing a configuration of a temperature cooling portion in the boosting system according to an embodiment of the present invention.

For example, as shown in FIG. 3, the control portion 91 includes a determination portion 91$a$ which is connected to the pressure detection portion P and a flow rate determination portion 91$b$ which is connected to the determination portion 91$a$.

The determination portion 91$a$ is electrically connected to the pressure detection portion P, and performs determination processing such as whether or not the detection value detected by the pressure detection portion P belongs to a preset and predetermined pressure range. The predetermined pressure range is a numerical range including the target pressure of the target supercritical fluid F4 generated by the boosting system 1, is input to the determination portion 91$a$ via input means (not shown), and is stored and held in the determination portion 91.

The determination portion 91$a$ calculates an amount of difference between the predetermined pressure range stored in the determination portion 91$a$ and the detection value of the pressure detection portion P. The amount of difference which is the result determined by the determination portion 91$a$ is transmitted to the subsequent flow rate determination portion 91$b$.

The flow rate determination portion 91$b$ performs predetermined calculation based on the amount of difference of the pressure value input from the determination portion 91$a$ and calculates the opening degree of the flow rate adjusting portion 92. More specifically, first, the amount of difference of the pressure value, and an amount of increase/decrease of a flow rate required for canceling out the amount of difference are derived from a predetermined relational expression. In addition, this relational expression is empirically obtained by performance conditions or the like of the boosting system 1.

Sequentially, the flow rate determination portion 91b calculates an opening degree of the flow rate adjusting portion 92 based on the amount of increase/decrease of the flow rate derived from the relational expression. In addition, a relationship between the amount of increase/decrease of the flow rate and the opening degree of the flow rate adjusting portion 92 is determined by performance conditions or the like of the valve portion which is used as the flow rate adjusting portion 92.

In this way, the control portion 91 determines the opening degree of the flow rate adjusting portion 92. Thereafter, the flow rate determination portion 91b transmits instruction information related to an increase or a decrease of the opening degree to the flow rate adjusting portion 92. The flow rate adjusting portion 92 (flow rate adjustment valve), to which the instruction information from the flow rate determination portion 91b is input, adjusts the opening degree according to the instruction information.

The low-temperature liquid F5 from the liquid extraction and decompression portion 6 is returned to the upstream side of the sixth stage compression impeller 16 of the compression portion 2 through the bypass flow path 7. That is, one end of the bypass flow path 7 is connected to the heat exchange portion 42 of the liquid extraction and decompression portion 6, and the other end of the bypass flow path 7 is connected to the pipe line 8j between the sixth stage compression impeller 16 and the fifth intermediate cooler 25.

Next, a state change of the carbon dioxide F (boosting method of carbon oxide F) will be described with reference to a P-h diagram of FIG. 2.

Figure 2:
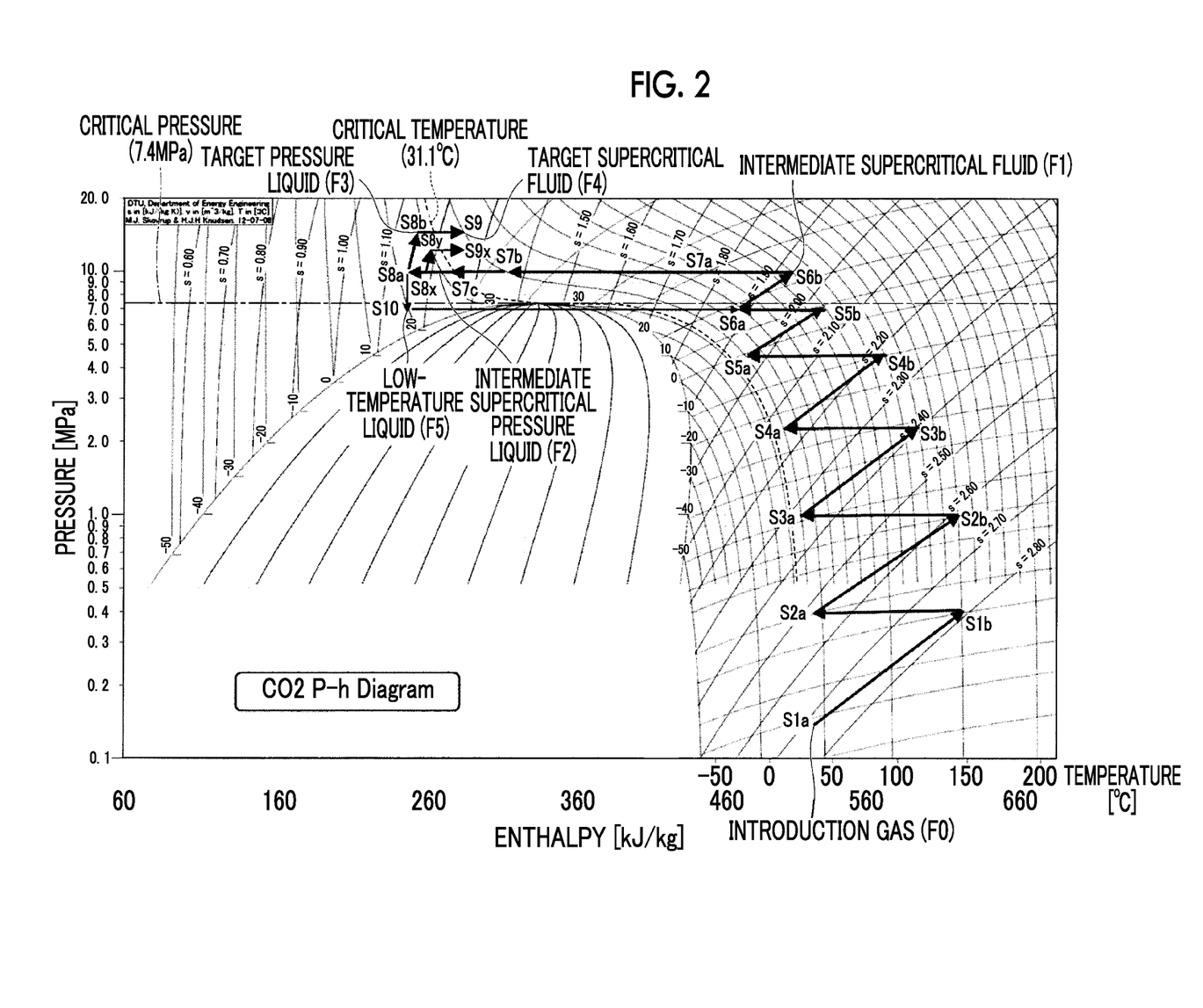
FIG. 2 is a P-h diagram showing a state of carbon dioxide in the boosting system according to the embodiment of the present invention.

In the compression portion 2, as shown by a solid line of FIG. 2, the introduction gas F0 (State S1a) which is introduced into the first stage compression impeller 11 is compressed by the first stage compression impeller 11 and is brought into State S1b having a higher pressure and temperature than those of State S1a. Thereafter, the gas is cooled in an isobaric manner by the first intermediate cooler 21, and is brought into State S2a. In this way, compression and cooling are repeated, the state is changed according to an order of State S2b→State S3a→State S3b→State S4a→State S4b→State S5a→State S5b→Stage S6a→State S6b→State S7a→State S7b, and the state is brought into the state of the intermediate supercritical fluid F1 having a pressure equal to or greater than the critical pressure (compression step).

Thereafter, the intermediate supercritical fluid F1 in State S7b is introduced into the pre-cooling portion 29. In the pre-cooling portion 29, the intermediate supercritical fluid F1 is further cooled in an isobaric state, and the temperature of the intermediate supercritical fluid F1 can be decreased (cooling step). However, in the present embodiment, the pre-cooling portion 29 is not used.

The intermediate supercritical fluid F1 is cooled by the main cooling portion 28 in an isobaric manner in a state where a supercritical pressure is maintained and is brought into State S8a having a temperature less than or equal to the critical temperature, the phase of the intermediate supercritical fluid F1 is changed to the intermediate supercritical pressure liquid F2, and the intermediate supercritical pressure liquid F2 is introduced into the pump portion 3 (cooling step).

In the pump portion 3, the intermediate supercritical pressure liquid F2 in State S8a is boosted to a target pressure at which the intermediate supercritical pressure liquid F2 can be stored under the ground on land or under the ground of a sea bottom, the temperature of the intermediate supercritical pressure liquid F2 increases, and the intermediate supercritical pressure liquid F2 is brought into a target pressure liquid F3 in State S8b (pumping step). Thereafter, the target pressure liquid F3 is heated by the heating portion 5, the temperature of the target pressure liquid F3 increases in an isobaric manner so as to be equal to or greater than the critical temperature, and the target pressure liquid F3 is brought into a final state S9 in which the carbon dioxide F can be stored under the ground on land or under the ground of a sea bottom.

Here, a portion of the intermediate supercritical pressure liquid F2, which has been brought into State S8a by the main cooling portion 28, is extracted by adjusting the opening degree of the flow rate adjusting portion 92 of the cooling temperature adjusting portion 9.

In this case, an amount of the extracted intermediate supercritical pressure liquid F2 is adjusted according to the opening degree of the flow rate adjusting portion 92. The extracted intermediate supercritical pressure liquid F2 is decompressed and is brought into the low-temperature liquid F5 in State S10. The pressure of the low-temperature liquid F5 in State 10 becomes a pressure corresponding to the pressure of the upstream side of the sixth stage compression impeller 16 and the downstream side of the fifth intermediate cooler 25.

In addition, the low-temperature liquid F5 is heated by heat exchange between the low-temperature liquid F5 and the cooling portion 4, is evaporated in a state where an isobaric state is maintained, and is turns into gas or a supercritical fluid in State S6a on the upstream side of the sixth stage compression impeller 16. The gas or the supercritical fluid is returned to the upstream side of the sixth stage compression impeller 16 via the bypass flow path 7, and is mixed with the intermediate supercritical fluid F1 circulating through the compression portion 2.

According to the boosting system 1, first, compression of the carbon dioxide F is performed by the compression portion 2 in the front stage, boosting in the rear stage having a higher pressure than that of the front stage is performed by the pump portion 3, and the target pressure liquid F3 is generated. Thereafter, the target pressure liquid F3 is finally heated so as to be equal to or greater than the critical temperature by the heating portion 5, and it is possible to obtain the target supercritical fluid F4 which can be stored under the ground on land or under the ground of a sea bottom.

Here, when an impeller similar to the impeller of the compression portion 2 is applied to the portion on the rear stage side having a higher pressure, multiple high-pressure seals or multiple compressor casings corresponding to a high pressure are required, and there are problems in that reliability decreases and costs increase. In addition, in order to cope with the high pressure state, it is necessary to increase a shaft diameter of the impeller or decrease a rotating speed of the impeller, and there are problems that reliability and operation efficiency decrease.

In order to solve the problems, in the present embodiment, the pump portion 3 is adopted on the higher pressure side. Since a liquid is boosted by the pump portion 3, when the liquid is boosted so as to be a high pressure state (approximately 15 to 60 [MPa]), an object fluid is easily sealed, which is very advantageous. Accordingly, it is possible to avoid an increase in costs, and it is possible to solve problems of reliability and operation efficiency.

In addition, when an impeller similar to the impeller of the compression portion 2 is applied to the rear stage side having a higher pressure, cooling of the sixth intermediate cooler 26 stops at State S7 in order to avoid compression in a transition region in which characteristics are unstable, and the temperature of the boosted supercritical fluid is higher than that of the target supercritical fluid F4. Accordingly, in order to obtain the target supercritical fluid F4, an after-cooler for performing cooling after compression or the like is further required.

With respect to this, in the present embodiment, the after-cooler or the like is not required, and it is possible to decrease power consumption for operating the after-cooler.

In addition, in the cooling portion 4, the intermediate supercritical fluid F1, which is compressed so as to be equal to or greater than the critical pressure by the compression portion 2, is brought into the intermediate supercritical pressure liquid F2.

Here, according to the P-h diagram shown in FIG. 2, an isothermal line rises so as to be approximately parallel with a vertical axis (pressure) in a region less than the critical pressure, and gaps between isothermal lines are narrowed. Meanwhile, in a transition region which is equal to or greater than the critical pressure and is near to the critical temperature, the isothermal line is approximately parallel with a horizontal axis (enthalpy), and the gaps between the isothermal lines are widened. Accordingly, in the transition region, when the state of the carbon dioxide F is changed in an isobaric state, enthalpy is greatly changed with a smaller change of the temperature.

Accordingly, compared to when the intermediate supercritical fluid F1 is cooled in a state where a pressure is less than the critical pressure, when the intermediate supercritical fluid F1 is cooled in a state where a pressure is equal to or greater than the critical pressure as in the present embodiment, it is possible to liquefy the intermediate supercritical fluid F1 while decreasing the quantity of heat required for cooling.

In addition, first, the intermediate supercritical fluid F1 is cooled to the transition region in a water cooling manner using only the sixth intermediate cooler 26. Here, since the intermediate supercritical fluid F1 has a pressure and a temperature near to the critical pressure and the critical temperature, as described, enthalpy is greatly changed with a smaller change of the temperature, and it is possible to obtain most of the amount of cold energy required for liquefaction of the intermediate supercritical fluid F1 using only a water cooling manner.

In addition, a state of an inner portion of the pipe line 8m through which the intermediate supercritical pressure liquid F2 flows is isobaric. Accordingly, a density and a temperature of the intermediate supercritical pressure liquid F2 are in an inverse relationship to each other according to the opening degree of the flow rate adjusting portion 92 of the cooling temperature adjusting portion 9. More specifically, when the opening degree of the flow rate adjusting portion 92 is adjusted so as to be increased by the control portion 91, the temperature of the intermediate supercritical pressure liquid F2 decreases while the density of the intermediate supercritical pressure liquid F2 increases. On the other hand, when the opening degree of the flow rate adjusting portion 92 is adjusted so as to be decreased, the temperature of the intermediate supercritical pressure liquid F2 increases while the density of the intermediate supercritical pressure liquid F2 decreases.

Accordingly, for example, when the opening degree of the flow rate adjusting portion 92 is adjusted so as to be decreased, the temperature of the intermediate supercritical pressure liquid F2 in State S8 in which the intermediate supercritical pressure liquid F2 is introduced into the pump portion 3 increases and the density of the intermediate supercritical pressure liquid F2 decreases, and the intermediate supercritical pressure liquid F2 is brought into State S8x.

Figure 4:
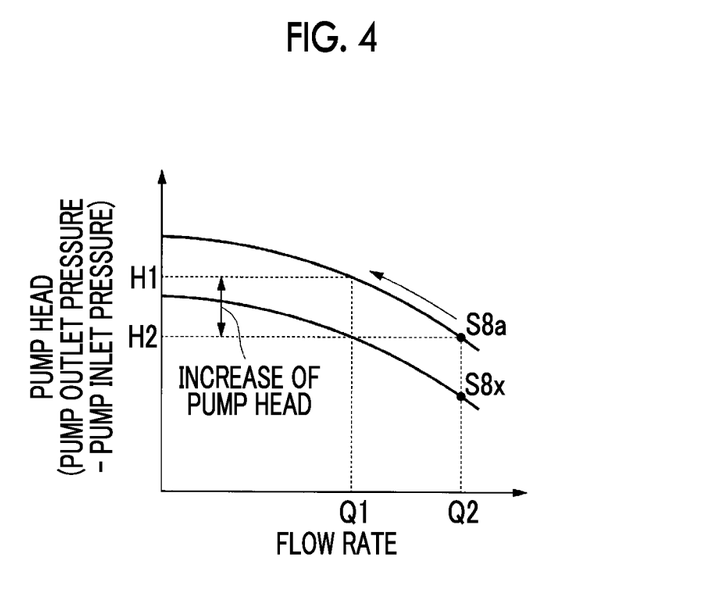
FIG. 4 is a Q-H diagram showing a change of performance characteristics of a pump portion according to a state of a fluid introduced into the pump portion in the boosting system according to the embodiment of the present invention.

Here, FIG. 4 is a Q-H diagram showing a relationship between a pressure difference (pump head) between an inlet and an outlet of the pump portion 3, and a flow rate. As shown in FIG. 4, the entire pump head of a Q-H curve of the intermediate supercritical pressure liquid F2 in State S8x is smaller than the entire pump head of the Q-H curve of the intermediate supercritical pressure liquid F2 in State S8a. That is, the temperature of the intermediate supercritical pressure liquid F2 increases and the density thereof decreases. Accordingly, the pressure of the target pressure liquid F3 generated by the pump portion 3 decreases and is brought into State S8y of FIG. 2.

The target pressure liquid F31 in State S8y is introduced into the heating portion 5, is heated in an isobaric state, and is brought into the target supercritical fluid F4 in State S9x.

In this way, since the temperature of the intermediate supercritical pressure liquid F2 introduced into the pump portion 3 is adjusted, it is possible to adjust the pressure (target pressure) of the finally obtained target supercritical fluid F4 without changing the rotation speed of a pump of the pump portion 3 or the like.

In addition, as shown in FIG. 4, since the temperature of the intermediate supercritical pressure liquid F2 introduced into the pump portion 3 is adjusted even when the flow rate is small, it is possible to adjust the pressure of the finally obtained target supercritical fluid F4 so as to be a constant target pressure without changing the rotation speed of a pump of the pump portion 3 or the like.

Accordingly, it is possible to obtain a target pressure without providing a variable speed motor or the like in the pump portion 3.

In addition, in the present embodiment, the pressure of the target supercritical fluid F4 is detected by the pressure detection portion P provided in the intermediate position of the pipe line 8p at any time. The detected pressure value is input to the control portion 91 of the cooling temperature adjusting portion 9. The control portion 91 determines the opening degree of the flow rate adjusting portion 92 using predetermined calculation and performs adjustment. The above-described operation is autonomously performed by the cooling temperature adjusting portion 9 and the pressure detection portion P. Accordingly, even when variation in the pressure of the target supercritical fluid F4 is generated due to disturbance factors or the like, the opening degree of the flow rate adjusting portion 92 is autonomously adjusted according to the variation, and the pressure of the target supercritical fluid F4 is corrected so as to be a predetermined and desired target pressure. Accordingly, it is possible to supply the target supercritical fluid F4 in a state where the pressure of the target supercritical fluid F4 is stabilized.

In addition, since the cooling temperature adjusting portion 9 is provided, for example, it is not necessary to provide a control valve or the like so as to cope with a high-pressure load, as the flow rate adjusting portion 92. Accordingly, it is possible to decrease costs. In addition, it is possible to decrease pressure loss which is generated in the flow rate adjusting portion 92 when a high-pressure valve is used.

In addition, in the present embodiment, the cooling medium of the main cooling portion 28 is the low-temperature liquid F5 from the liquid extraction and decompression portion 6. However, when an external appropriate cooling medium W is obtained from the outside, it is possible to decrease an amount of cold energy needed in the main cooling portion 28 by pre-cooling the cooling medium W using the pre-cooling portion 29. For example, in this case, the cooling from State S7b to State S7c is performed by the pre-cooling portion 29, and the cooling from State S7c to State S8a is performed by the main cooling portion 28.

Accordingly, even when the flow rate of the low-temperature liquid F5 is decreased due to the pre-cooling portion 29, it is possible to sufficiently perform the cooling using the main cooling portion 28. Accordingly, since it is possible to decrease the flow rate of the low-temperature liquid F5 returned to the compression portion 2 via the bypass flow path 7, it is possible to decrease power consumption in the compression portion 2, and operation efficiency is improved.

Moreover, since the cooling medium of the main cooling portion 28 is the low-temperature liquid F5, it is possible to securely generate the intermediate supercritical pressure liquid F2 introduced into the pump portion 3 effectively using the cold energy of the intermediate supercritical pressure liquid F2 itself introduced into the pump portion 3, that is, without separately installing a condenser required for generating the intermediate supercritical pressure liquid F2 from the intermediate supercritical fluid F1.

In addition, in the main cooling portion 28, the intermediate supercritical pressure liquid F2 is generated by cooling the intermediate supercritical fluid F1 compressed by the compression portion 2, the intermediate supercritical pressure liquid F2 can be introduced into the pump portion 3, and it is possible to heat the intermediate supercritical pressure liquid F2 so as to be equal to or greater than the critical temperature by performing heat exchange between the heating portion 5 and the intermediate supercritical pressure liquid F2 using heat which is recovered when the intermediate supercritical fluid F1 is cooled.

In addition, since heat exchange is performed in a high-pressure state equal to or greater than the critical pressure in cooling the intermediate supercritical fluid F1 using the cooling portion 4 and heating the target pressure liquid F3 using the heating portion 5, it is possible to cause the heat exchange portion to be compact, and it is possible to achieve compactification of the entire system.

Moreover, since the bypass flow path 7 is provided, the extracted intermediate supercritical pressure liquid F2 is not discharged to the outside. Accordingly, it is possible to further improve efficiency of the entire boosting system 1.

In addition, as shown in FIG. 4, the pump head of the pump portion 3 is likely to be improved as the flow rate of the fluid introduced into the pump portion 3 decreases. Accordingly, the amount of the pump head in the pump portion 3 is improved even with a small flow rate, and the amount of compression needed in the compression portion 2 decreases. Accordingly, the flow rate of the introduction gas F0 introduced into the compression portion 2 decreases, and it is possible to decrease the pressure of the intermediate supercritical fluid F1 generated by the compression portion 2.

Here, as means for adjusting the flow rate of the introduction gas F0 introduced into the compression portion 2, for example, an Inlet Guide Vane (IGV) (not shown) or the like is adopted. The IGV is a throttle valve which is provided in the middle of the pipe line and can adjust the opening degree. The flow rate of the introduction gas F0 introduced into the compression portion 2 can be decreased as the opening degree of the IGV decreases. In addition, preferably, the IGV is provided in the introduction portion of the first stage compression impeller 11.

Figure 5:
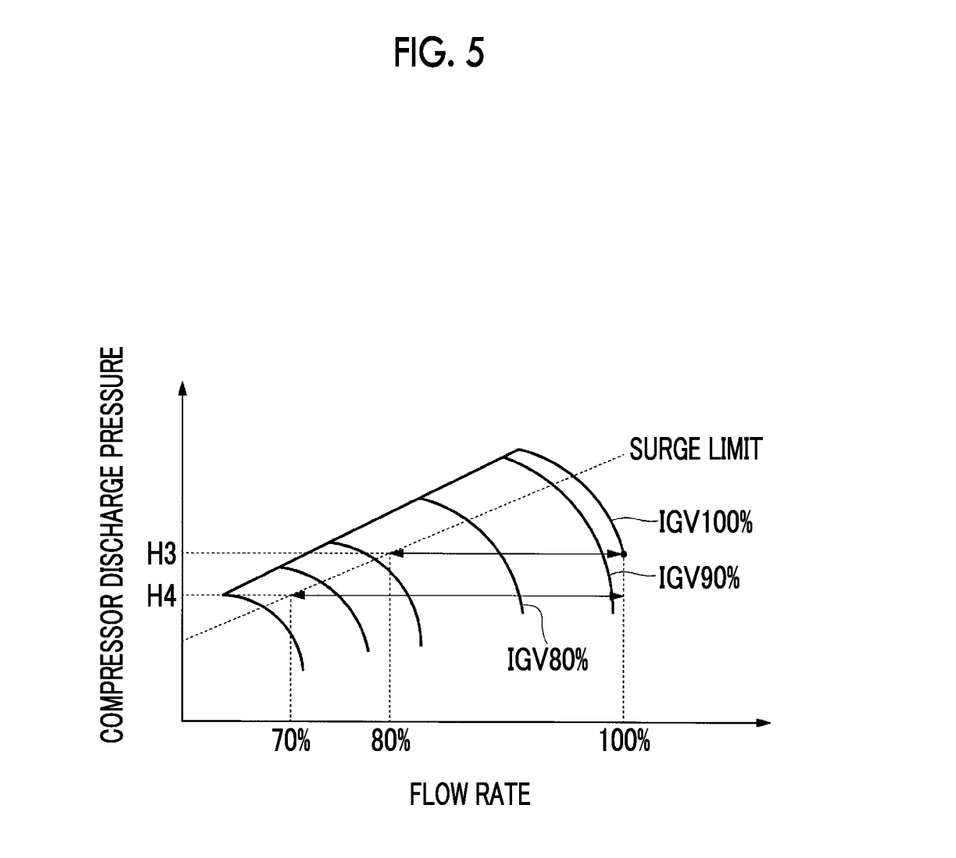
FIG. 5 is a diagram showing an opening degree of an Inlet Guide Vane (IGV) of a compression portion, and performance characteristics corresponding to a flow rate of a fluid introduced into the compression portion, in the boosting system according to the embodiment of the present invention.

FIG. 5 is a diagram showing performance characteristics of the compression portion 2 according to a change of the opening degree of the IGV. As understood from FIG. 5, the flow rate of the fluid introduced into the compression portion 2 decreases as the opening degree of the IGV is changed from 100% at which the IGV is fully opened to 90% and 80%. Here, a value of a limit flow rate reaching a surge limit increases as a discharge pressure of the compression portion 2 increases. The example of FIG. 5 shows two operation states when the discharge pressure is H3 and when the discharge pressure is H4 which is lower than H3. When the discharge pressure is H3, the value of the limit flow rate reaches the surge limit to the flow rate is 80%. However, when the discharge pressure is H4, the flow rate reaching the surge limit is expanded to 70%. Accordingly, since the amount of the pump head in the pump portion 3 is improved even with a smaller flow rate, it is possible to decrease the amount of compression needed in the compression portion 2, and it is possible to decrease the discharge pressure of the compression portion 2, that is, the pressure of the intermediate supercritical fluid F1 generated by the compression portion 2.

That is, the discharge pressure is decreased by decreasing the opening degree of the IGV, and it is possible to expand an allowable range (operation range) of the flow rate.

Accordingly, it is possible to widen the pressure range of the target supercritical fluid F4 obtained by the boosting system 1.

In addition, in the above-described embodiment, the example in which the geared compressor is used in the compression portion 2 is described. However, the compressor used in the compression portion 2 is not limited to the geared compressor, and may adopt other type compressors.

REFERENCE SIGNS LIST

1 . . . boosting system, 2 . . . compression portion, 3 . . . pump portion, 4 . . . cooling portion, 5 . . . heating portion, 6 . . . liquid extraction and decompression portion, 7 . . . bypass flow path, 8a, 8b, 8c, 8d, 8e, 8f, 8g, 8h, 8i, 8j, 8k, 8l, 8m, 8n, 8p . . . pipe line, 9 . . . cooling temperature adjusting portion, 11 . . . first stage compression impeller, 12 . . . second stage compression impeller, 13 . . . third stage compression impeller, 14 . . . fourth stage compression impeller, 15 . . . fifth stage compression impeller, 16 . . . sixth stage compression impeller, 20 . . . intermediate cooler, 21 . . . first intermediate cooler, 22 . . . second intermediate cooler, 23 . . . third intermediate cooler, 24 . . . fourth intermediate cooler, 25 . . . fifth intermediate cooler, 26 . . . sixth intermediate cooler, F . . . carbon dioxide (target gas), F0 . . . introduction gas, F1 . . . intermediate supercritical fluid, F2 . . . intermediate supercritical pressure liquid, F3 . . . target pressure liquid, F4 . . . target supercritical fluid, F5 . . . low-temperature liquid, W . . . external cooling medium, 28 . . . main cooling portion, 29 . . . pre-cooling portion, 31 . . . first stage pump impeller, 32 . . . second stage pump impeller, 41 . . . branched pipe line, 42 . . . heat exchange portion, 91 . . . control portion, 91a . . . determination portion, 91b . . . flow rate determination portion, 92 . . . flow rate adjusting portion, 93 . . . control signal line

The invention claimed is:

1. A boosting system which boosts a target gas to a pressure which is equal to or greater than a target pressure higher than a critical pressure, comprising:
   a compression portion which compresses the target gas to an intermediate pressure which is equal to or greater than the critical pressure and is less than the target pressure, and generates a first intermediate supercritical fluid;
   a cooling portion which cools the first intermediate supercritical fluid generated by the compression portion to a critical temperature in a state where the intermediate pressure is maintained, and generates a second intermediate supercritical fluid;
   a pump portion which boosts the second intermediate supercritical fluid generated by the cooling portion to a pressure which is equal to or greater than the target pressure, and generates a third intermediate supercritical fluid; and
   a cooling temperature adjusting portion which adjusts a temperature of the first intermediate supercritical fluid generated by the compression portion using a cooling medium in an upstream side of the pump portion,
   wherein the cooling temperature adjusting portion extracts a portion of the second intermediate supercritical fluid as the cooling medium from between the cooling portion and the pump portion.

2. The boosting system according to claim 1, further comprising:
   a heating portion which heats the third intermediate supercritical fluid boosted by the pump portion to the critical temperature, and generates a target supercritical fluid,
   wherein the cooling portion includes a main cooling portion which performs heat exchange between the heating portion and the main cooling portion to cool the first intermediate supercritical fluid.

3. The boosting system according to claim 1,
   wherein the cooling temperature adjusting portion adjusts a flow rate of the cooling medium which is supplied to the cooling portion.

4. The boosting system according to claim 2, further comprising:
   a pressure detection portion which detects a pressure of the target supercritical fluid,
   wherein the cooling temperature adjusting portion includes a flow rate adjusting portion which adjusts a flow rate of the cooling medium supplied to the cooling portion, and
   a control portion which controls the flow rate adjusting portion based on a detection value detected by the pressure detection portion,
   wherein the control portion includes a determination portion which determines whether or not the detection value within, or not within a predetermined pressure range, and
   wherein a flow rate determination portion which determines a flow rate adjusted by the flow rate adjusting portion, based on a determination result of the determination portion.

5. A boosting method of gas which boosts a target gas to a pressure which is equal to or greater than a target pressure higher than a critical pressure, comprising:
   a compression step of compressing the target gas to an intermediate pressure which is equal to or greater than the critical pressure and is less than the target pressure, and generating a first intermediate supercritical fluid;
   a cooling step of cooling the first intermediate supercritical fluid generated in the compression step to a critical temperature in a state where the intermediate pressure is maintained, and generating a second intermediate supercritical fluid;
   a cooling temperature adjusting step of adjusting a temperature of the second intermediate supercritical fluid generated in the cooling step; and
   a pumping step of boosting the second intermediate supercritical fluid generated in the cooling step to a pressure which is equal to or greater than the target pressure, and generating a third intermediate supercritical fluid,
   wherein in the cooling step, the first intermediate supercritical fluid is cooled using at least one of the third intermediate supercritical fluid generated in the pumping step, a low-temperature liquid which is generated by extracting the second intermediate supercritical fluid before the pumping step starts and decompressing the second intermediate supercritical fluid near to the critical pressure, and an external cooling medium, as a cooling medium.

* * * * *